US009435651B2

(12) United States Patent
Morin

(10) Patent No.: US 9,435,651 B2
(45) Date of Patent: *Sep. 6, 2016

(54) SYSTEM AND METHOD FOR AUGMENTING A GNSS/INS NAVIGATION SYSTEM IN A CARGO PORT ENVIRONMENT

(71) Applicant: NovAtel Inc., Calgary (CA)

(72) Inventor: Kristian Morin, Calgary (CA)

(73) Assignee: Hexagon Technology Center GmbH, Stockholm (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/295,749

(22) Filed: Jun. 4, 2014

(65) Prior Publication Data

US 2015/0354966 A1 Dec. 10, 2015

(51) Int. Cl.
*G01C 21/16* (2006.01)
*G01S 19/14* (2010.01)
*G01S 19/48* (2010.01)

(52) U.S. Cl.
CPC ............ *G01C 21/165* (2013.01); *G01S 19/14* (2013.01); *G01S 19/48* (2013.01)

(58) Field of Classification Search
CPC ...... H04N 7/18; G01C 21/165; G01S 19/48; G01S 19/14
See application file for complete search history.

(56) References Cited

U.S. PATENT DOCUMENTS

| 6,721,657 | B2 | 4/2004 | Ford et al. |
| 2002/0191813 | A1 | 12/2002 | Uchida et al. |
| 2005/0190988 | A1 | 9/2005 | Feron |
| 2007/0010936 | A1* | 1/2007 | Nordmark ............ G01C 21/165 701/472 |
| 2007/0159922 | A1* | 7/2007 | Zimmerman ....... G01S 7/52004 367/103 |
| 2013/0211658 | A1* | 8/2013 | Bonefas ................. B65G 67/24 701/28 |

OTHER PUBLICATIONS

Gaspar, et al., Vision-based Navigation and Environmental Representations with an Omni-directional Camera, *IEEE Transactions on Robotics and Automation*, vol. 16, No. 6, Dec. 2000, pp. 890-898, 9 Pages.

Retscher, et al., "Location Determination in Indoor Environments for Pedestrian Navigation", Plans 2006—Proceedings of IEEE/ION Plans 2006, The Institute of Navigation, 8551 Rixlew Lane Suite 360 Manassas, VA 20109, USA, Apr. 27, 2006, pp. 547-555, XP056006480.

Wang, et al., "Vision Aided GPS/INS System for Robust Land Vehicle Navigation", GNSS 2009—Proceedings of the 22$^{nd}$ International Technical Meeting of the Satellite Division of the Institute of Navigation (ION GNSS 2009), The Institute of Navigation, 8551 Rixlew Lane Suite 360 Manassas, VA 20109, USA, Sep. 25, 2009, pp. 600-609, XP056010502.

(Continued)

*Primary Examiner* — Mary Cheung
*Assistant Examiner* — Yuen Wong
(74) *Attorney, Agent, or Firm* — Cesari and McKenna, LLP

(57) ABSTRACT

A system and method for augmenting a GNSS/INS system by using a vision system is provided. The GNSS system generates GNSS location information and the INS system generates inertial location information. The vision system further generates vision system location information including horizon, plumb lines and distance traveled. The GNSS information, INS information and vision system are combined in a Kalman filter to produce improved location information.

15 Claims, 5 Drawing Sheets

(56) References Cited

OTHER PUBLICATIONS

Eitner, et al., "Development of a Navigation Solution for an Image Aided Automatic Landing System", PNT 2013—Proceedings of the ION 2013 Pacific PNT Meeting, The Institute of Navigation, 8551 Rixlew Lane Suite 360 Manassas, VA 20109, USA, Apr. 25, 2013, pp. 879-891, XP056008251.

"Extended European Search Report" European Filing Date: Jun. 2, 2015, European Filing No. 15170268.5, Applicant: NovAtel Inc., Date of Mailing: Oct. 27, 2015, pp. 1-12.

* cited by examiner

SYSTEM AND METHOD FOR AUGMENTING A GNSS/INS NAVIGATION SYSTEM IN A CARGO PORT ENVIRONMENT

FIELD OF THE INVENTION

The present invention relates generally to GNSS/INS receivers and more particularly to GNSS/INS receivers for use in cargo port environments.

BACKGROUND OF THE INVENTION

Cranes and other vehicles that are utilized in cargo port operations may utilize some form of navigation system help provide location information within the cargo port. Such a navigation system may comprise a satellite navigation system, such as a GNSS system. The GNSS system may be paired with an inertial navigation system (INS) for improved accuracy. The combined GNSS/INS system provides current location and navigation information that may be utilized by the driver of the vehicle to navigate throughout the cargo port environment. The INS system may aid in navigation if the GNSS system loses accuracy, which may occur when, e.g., multipath situations occur. A multipath situation occurs when, e.g., signals transmitted from GNSS satellites are reflected by local terrain and/or buildings, thereby resulting in a plurality of signals being received by the GNSS receiver. Due to the plurality of signals being received, each of which may be phase shifted and/or time delayed, the GNSS receiver may not be able to accurately detect its location. In an exemplary cargo environment, a plurality of cargo containers may be stacked, thereby creating an obstruction that may result in additional multipath signals. As will be appreciated by those skilled in the art, the plurality of stacked containers located within a typical cargo port environment may create a significant multipass impediment to a GNSS system.

Vehicles utilized in a cargo port environment may include, e.g., cranes, forklifts, etc. Typically they are operating in a low dynamic capacity which generally means that the vehicles are operating at a low velocity and/or experiencing small dynamic sensations. In low dynamic environments, an INS system may not provide accurate navigation information to a combined GNSS/INS system. Thus, if the GNSS system loses accuracy, such as due to entering a multipath environment, the overall navigation system for the vehicle may be severely hindered in its accuracy.

SUMMARY OF THE INVENTION

The disadvantages of the prior art are overcome by providing a novel GNSS/inertial navigation system (INS) that is augmented by a vision system to provide accurate navigation and location information for use in a cargo port environment. A vision system is utilized in conjunction with a GNSS/INS system to obtain additional location information to improve location accuracy of a navigation system within the vehicle. Illustratively, the vision system analyzes an image obtained from an image acquisition device having a fixed field of view to calculate a horizon within the acquired image. Furthermore, plumb lines may be identified by analyzing containers within the fixed field of view. As containers are normally a predefined fixed size, scale information may be obtained by the vision system by analyzing the acquired image to determine containers stored within the acquired image. Such scale information may be utilized for determining distance traveled and, in conjunction with an elapsed time between a first and second acquired image, a speed or velocity of the vehicle.

The location information from the GNSS system, the INS system and the vision system is input into a Kalman filter that illustratively modifies the weighting of the GNSS information, INS information and vision system information based on a plurality of factors. For example, should a multipath environment be entered, the relative weightings of the GNSS information may be lowered. Similarly, if the vehicle is operating in a low dynamic environment, the weighting of the INS information may be lowered. In times of fog or other inclement weather which may limit visibility, the vision system information may have its relative weightings lowered within the Kalman filter. By varying the relative weights of the sources of location information, improved location information may be obtained in accordance with various embodiments of the present invention.

BRIEF DESCRIPTION OF THE DRAWINGS

The above and further advantages of the present invention are explained in relation to the following figures in which like reference numerals indicate similar functional or structural components, of which.

DETAILED DESCRIPTION OF AN ILLUSTRATIVE EMBODIMENT

Figure 1:
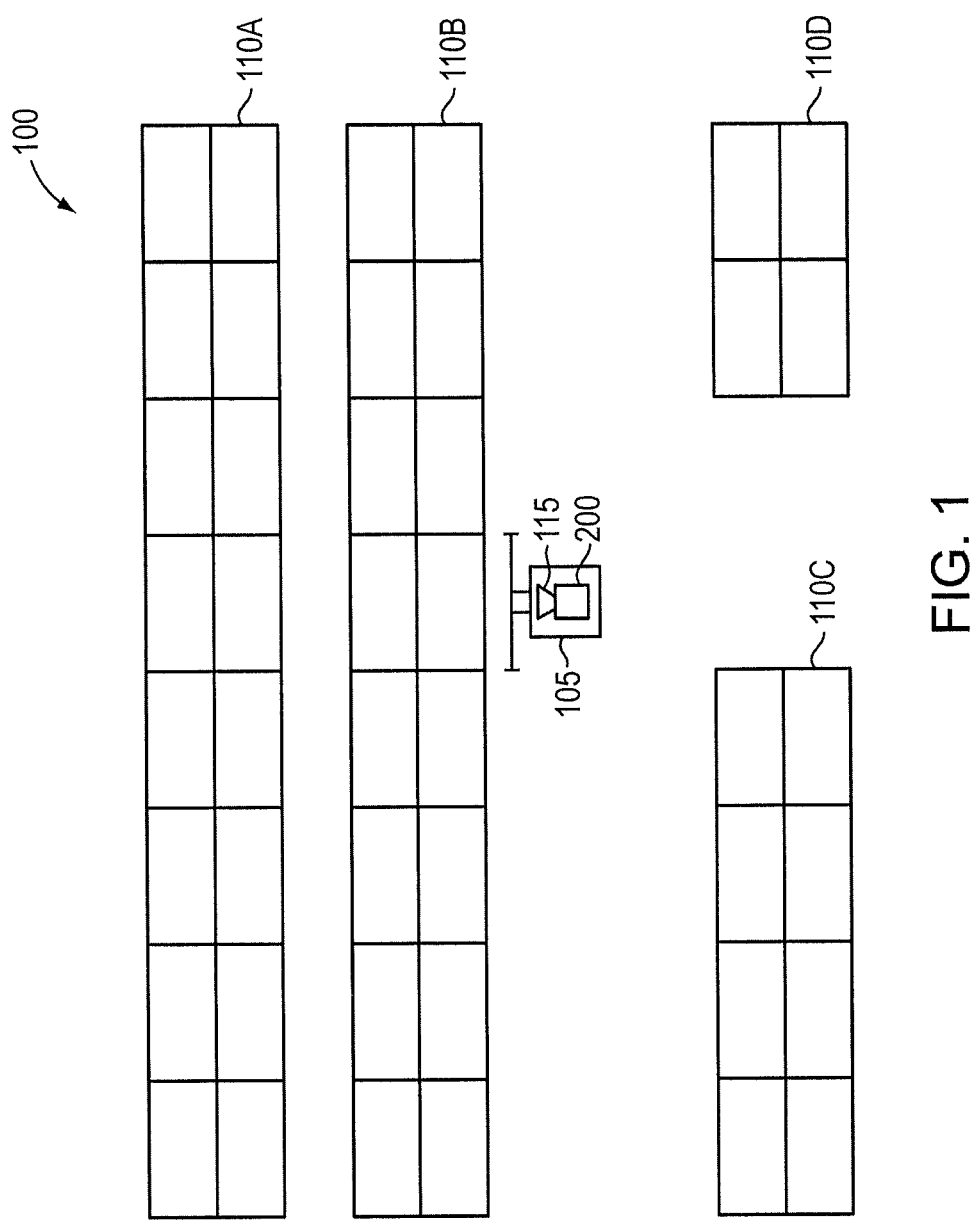
FIG. 1 is a top view of an exemplary cargo port environment in which the principles of the present invention may be utilized in accordance with an illustrative embodiment of the present invention.

FIG. 1 is an overhead view of an exemplary cargo port environment 100 in which the principles of the present invention may be implemented. A plurality of rows of containers 110 are arranged within the cargo port environment 100. An exemplary vehicle 105, which may comprise a crane, forklift, etc. is shown located in one of the aisles of the cargo port environment. Exemplary vehicle may be utilized by employees of the cargo to move various containers within the cargo port environment. For example, a crane may be utilized to unload a cargo container from a shipping vessel onto a truck that then moves the container to a designated area for storage. At a later point in time, another crane and/or forklift may be utilized to move the container onto another vehicle for delivery in the local area. As cargo ports may be quite large, e.g., hundreds of acres, accurate navigation information is important to ensure accurate and precise storage and loading of containers.

Vehicle 105 includes an exemplary navigation system 200, describe further below in relation to FIG. 2. The vehicle 105 also includes an exemplary antenna 115 that may be utilized for receiving GNSS signals in accordance with an illustrative embodiment of the present invention. As will be appreciated by those skilled in the art, containers 110 may be one of a plurality of fixed sizes. It should be noted that while cargo port environment 100 is shown with all containers 110 having the same fixed size, the principles of the present invention may be utilized in cargo port environments having containers of differing sizes. As such, the description of a cargo port environment 100 should be taken as exemplary only.

The cargo port vehicle 105 illustratively utilizes a GNSS/INS system 200 that provides location and navigation information regarding the vehicle 105 in accordance with an illustrative embodiment of the present invention. In alternative environments, a GNSS-only or INS-only navigation system may be utilized. However, for improved precision and accuracy, a combined GNSS/INS system is typically utilized. As such, the description of GNSS/INS system should be taken as exemplary only. One exemplary GNSS/INS system is described in U.S. Pat. No. 6,721,657, entitled INERTIAL GPS NAVIGATION SYSTEM, by Thomas J. Ford, et al, issued on Apr. 13, 2004, the contents of which are hereby incorporated by reference.

Figure 2:
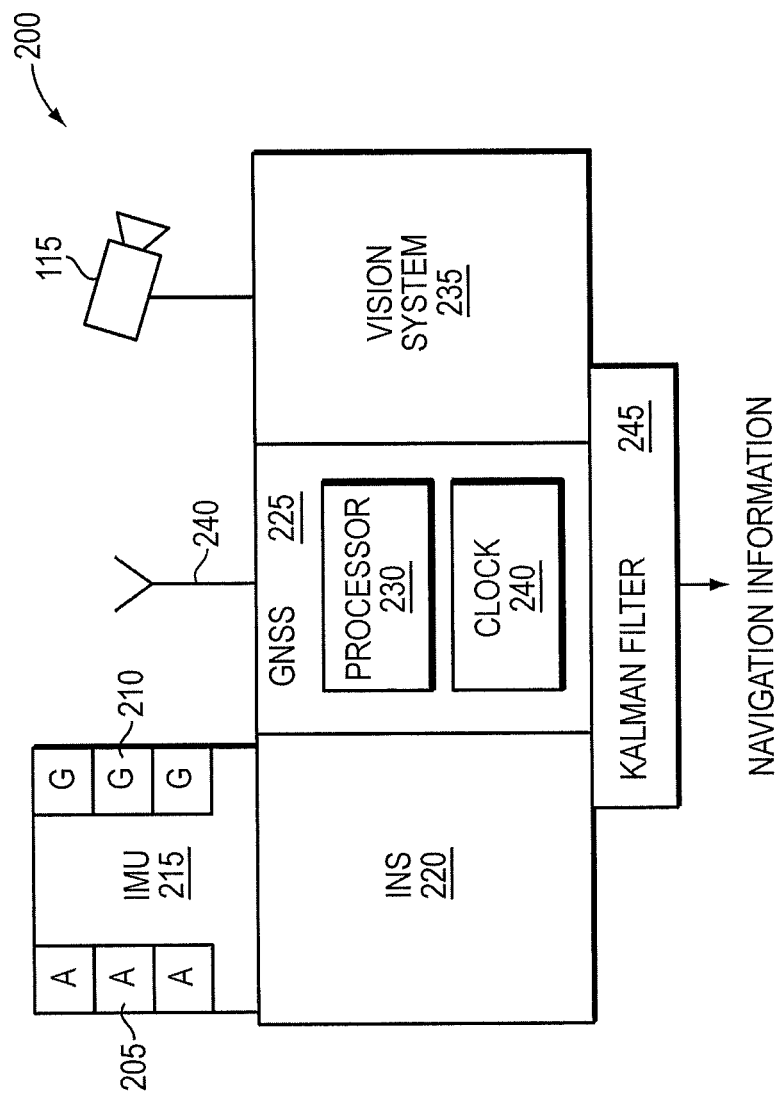
FIG. 2 is a functional block diagram of a GNSS/INS navigation system and vision system that may be utilized in accordance with an illustrative embodiment of the present invention.

FIG. 2 is a schematic block diagram of an exemplary navigation system, illustratively embodied as a GNSS/INS system 200 and vision system 235 in accordance with an illustrative embodiment of the present invention. The GNSS/INS system 200 includes an INS sub-system 220 and a GNSS sub-system 225 that operate under the control of a processor 230, to calculate GNSS position and INS position, velocity and attitude information. The GNSS subsystem processes the satellite signals received over the antenna 240. The INS system receives measurements from an inertial measuring unit ("IMU") 215 that reads data from orthogonally positioned accelerometers 205 and gyroscopes 210. The data from the IMU 215 is time tagged by the GNSS clock 240. The GNSS and INS systems can thus reliably interchange position-related information that is synchronized in time. The two systems operate together, through software integration in the processor 230, to provide position-related information between the systems.

For ease of understanding, the description of the processing operations of the two systems are made without specific reference to the processor 230. The system may instead include dedicated GNSS and INS sub-processors that communicate with one another at appropriate times to exchange information that is required to perform the various GNSS and INS calculation operations discussed below. For example, the INS sub-processor communicates with the GNSS processor when IMU data is provided to the sub-processor, in order to time-tag the data with GNSS time. Further, the GNSS sub-processor communicates with the INS sub-processor to provide GNSS position information at the start of each measurement interval, and so forth.

At start-up, the GNSS system 225 operates in a known manner to acquire the signals from at least a minimum number of GNSS satellites and calculate pseudoranges to the respective satellites and associated Doppler rates. Based on the pseudoranges, the GNSS system determines its position relative to the satellites. The GNSS system may also determine its position relative to a fixed-position base receiver (not shown), either through the use of differential correction measurements generated at the base station or after resolving associated carrier cycle ambiguities.

At the same time, the INS system 220 processes the IMU data, that is, the measurements from the various accelerometers 205 and gyroscopes 210, to determine the initial attitude and velocity of the receiver. The INS system further processes both the IMU data and the GNSS position and associated covariance information to set up various matrices for a Kalman filter 245. At the start of each measurement interval, the INS subsystem updates the Kalman filter and provides updated error states to a mechanization process. The mechanization process uses the updated information and the IMU data to propagate, over the measurement interval, the inertial position, attitude and velocity, with the inertial position and other system element errors being controlled with GNSS positions at the start of the measurement interval.

The IMU 215 plugs into a port (not shown) of the processor 230 and through the port supplies accelerometer and gyroscope measurement data to the processor. The IMU may be selected from a number of models and/or types, each associated with a different scaling factor and nominal accelerometer and gyroscope bias levels. The user may select a particular IMU model for navigation operations based on price and/or on the particular characteristics of the IMU.

At start-up, the INS system must thus determine which IMU is connected to the processor 230, in order to ensure that the IMU measurements are scaled correctly, and also to assign initial uncertainties to the attitude calculations. The INS system tests for a particular IMU by determining the scale factor associated with the accelerator measurements. The process thus compares a ratio of the magnitude of the normal gravity vector and the length of the scaled acceleration vector with stored ratios associated with the various IMU scale factors and selects the appropriate model/type.

A generic Kalman filter 245 processes estimates a series of parameters that describe and predict the behavior of a system. The Kalman filter 245 operates with a set of state variables that describe errors in the system and an associated variance covariance matrix that describes the current knowledge level of the state. The Kalman filter 245 maintains an optimal estimate of the system errors and associated covariance over time and in the presence of external measurements through the use of propagation and updating processes.

To propagate the state and its covariance from some past time to the current time, the Kalman filter propagation uses knowledge of the state dynamic behavior determined from the physics of the system and the stochastic characteristics of the system over time. Kalman filter updates thus uses the linear relationship between the state and observation vectors in conjunction with the covariance matrices related to those vectors to determine corrections to both the state vector and the state covariance matrix.

As noted above, the description contained herein comprises an exemplary embodiment of a GNSS/INS system. It is expressly noted that the principles of the present invention may be utilized with any system capable of providing real time location and navigation information. As such, the description contained herein should be taken as exemplary only.

An image acquisition device, such as camera 115, obtains one or more images of a fixed field of view. Illustratively, the camera 115 obtains a plurality of images of its fixed field of view every second. The images are conveyed to a vision system 235 that executes software (not shown) for calculating navigation and location information described further below. Illustratively, the vision system 235 is operatively connected to the clock 240 so that acquired images may be time stamped to a common clock that is also utilized for the GNSS and INS measurements. This enables the vision system 235 to provide location and navigation information at a particular point in time that is synchronized with the GNSS/INS system. In one illustrative embodiment, the clock 240 operates as a master clock to which the GNNS, INS and vision systems are slaves.

In operation, the INS system 220 generates inertial location information, the GNSS system 225 generates GNSS location information and the vision system 235 generates vision system location information. All three sets of location information are fed into the Kalman filter 245. As will be appreciated by those skilled in the art, the Kalman filter 245 weighs various inputs to generate a set of output location information.

For example, should the GNSS system encounter a multipath environment, the weighting of the GNSS navigation information may be lowered. Similarly, if the vehicle is moving slowly or otherwise experiencing dynamics that may lower or decrease the accuracy of the INS navigation information, the INS information may have its weighting lowered. Similarly, should fog or other weather conditions affect the quality of information being obtained by the vision system, the weighting of the vision system may be lowered by the Kalman filter. By dynamically adjusting the various weights of the input location information, the Kalman filter may work to ensure that the output location navigation information is of high quality.

Figure 3:
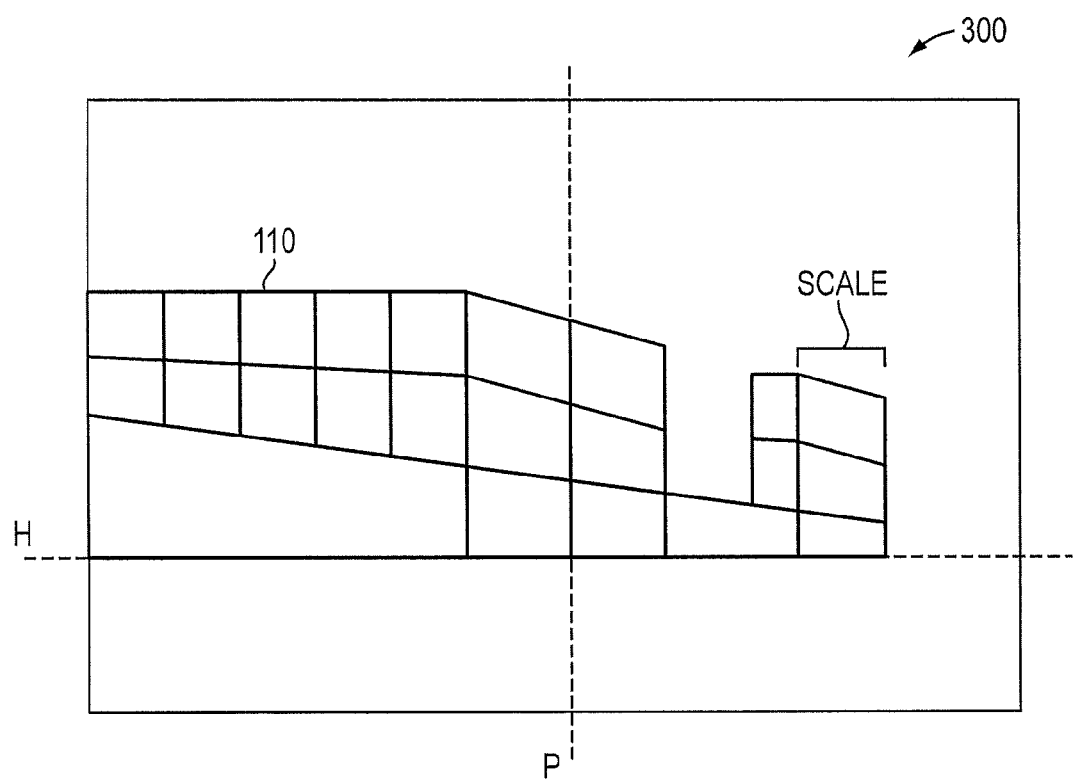
FIG. 3 is an exemplary acquired image from an image acquisition device from which horizon, plumb line and scale information may be calculated in accordance with an illustrative embodiment of the present invention.

FIG. 3 is an exemplary image 300 acquired by the image acquisition device 115 showing a fixed field of view in accordance with an illustrative embodiment of the present invention. As can be seen within the acquired image 300, there are a plurality of containers 110 stacked in various configurations. Illustratively, the vision system 235 performs a set of edge detection routines on the acquired image 300. As containers are substantially rectangular, edge detection techniques are well suited to determine the outline of containers. From exemplary image 300, the vision system may calculate a plurality of positioning system information that may be utilized improving location information in accordance with an illustrative embodiment of the present invention. Exemplary vision system location information that may be computed comprises a horizon H, plumb line (P) and scale information. By performing a series of edge detection routines within the acquired image, the vision system may obtain several types of information. As containers are generally rectangular in shape, detection of the vertical lines at the edges of containers may be utilized to determine plumb lines. Similarly, by detecting the regularly shaped containers, a determination of the horizon line may be made by determining where the base of the plurality of containers rests. Furthermore, as containers are of one of a limited number of predefined sizes, by performing edge detection routines to determine the outline of a container, scaling information may be obtained. That is, for example, if the vision system knows that containers are of a predefined size, e.g., 50 feet long, and the edge detection system detects a row of three of them arranged end to end, the vision system may calculate that the row has a length of 150 feet in the real world. By determining the number of pixels that the row occupies in the acquired image, the vision system may determine the size of each pixel represents. This scaling information may be utilized for location information by determining distances between objects within the fixed field of view.

Figure 4A:
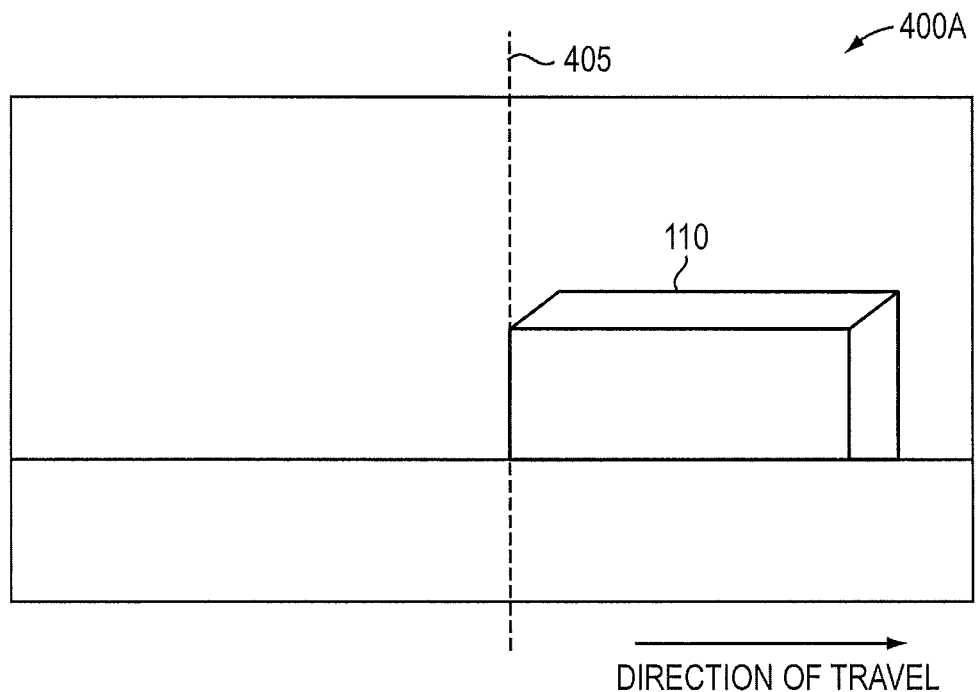
FIG. 4A is an exemplary image that may be utilized for determining distance traveled in accordance with an illustrative embodiment of the present invention.
Figure 4B:
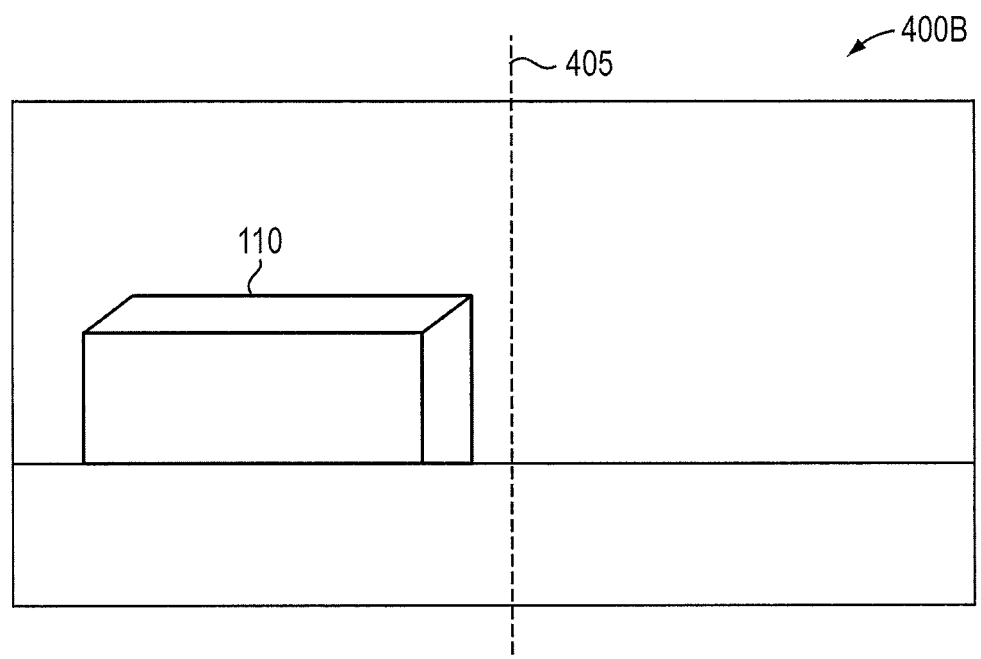
FIG. 4B is an exemplary image that may be utilized for determining distance traveled in accordance with an illustrative embodiment of the present invention.

FIG. 4A is an exemplary image 400A of a fixed field of view that made utilized in determining a distance traveled in accordance with an illustrative embodiment the present invention. In acquired image 400A, the image acquisition device has obtained an image of a container 110. An arbitrary line 405 which may comprise a halfway point of the field of view or other predefined line is noted. In exemplary image 400A, the line 405 is aligned with the leading age of the container 110. Illustratively, the vehicle is moving in the direction indicated by the arrow. FIG. 4B is an exemplary acquired image 400B that may be utilized for determining a distance traveled in accordance with an illustrative embodiment of the present invention. Again an arbitrary line 405 is indicated and as can be appreciated the container 110 has now passed the arbitrary line 405 within the field of view. By utilizing scaling information, such as that described above in relation to FIG. 3, the vision system may determine a distance traveled between the timestamps associated with images 400A, B. By utilizing a difference in the timestamps between acquired images for 400A, B, a speed that is the distance divided by time may be obtained. For example, if the vision system is programmed that containers are of a predetermined size, e.g., 50 feet, appropriate scale information may be obtained, as described above in reference to FIG. 3. Utilizing that scale information, the vision system may determine a number of pixels and have passed the arbitrary line 405 between the two acquired images 400 A, B. Multiplying the number of pixels that have passed the arbitrary line by a scaling factor, the vision system may determine a number of feet that the vehicle has moved. By comparing the two-time stamps associated with the first and second image 400 A, B, the vision system may determine a time difference between the two images. By dividing the distance traveled by the time televise.on system may obtain the speed of the vehicle. Direction information may be obtained from the acquired information due to, e.g., fiducials within the field of view, etc. By combining the speed and direction, the vision system may then determine a velocity associated with the vehicle.

Figure 5:
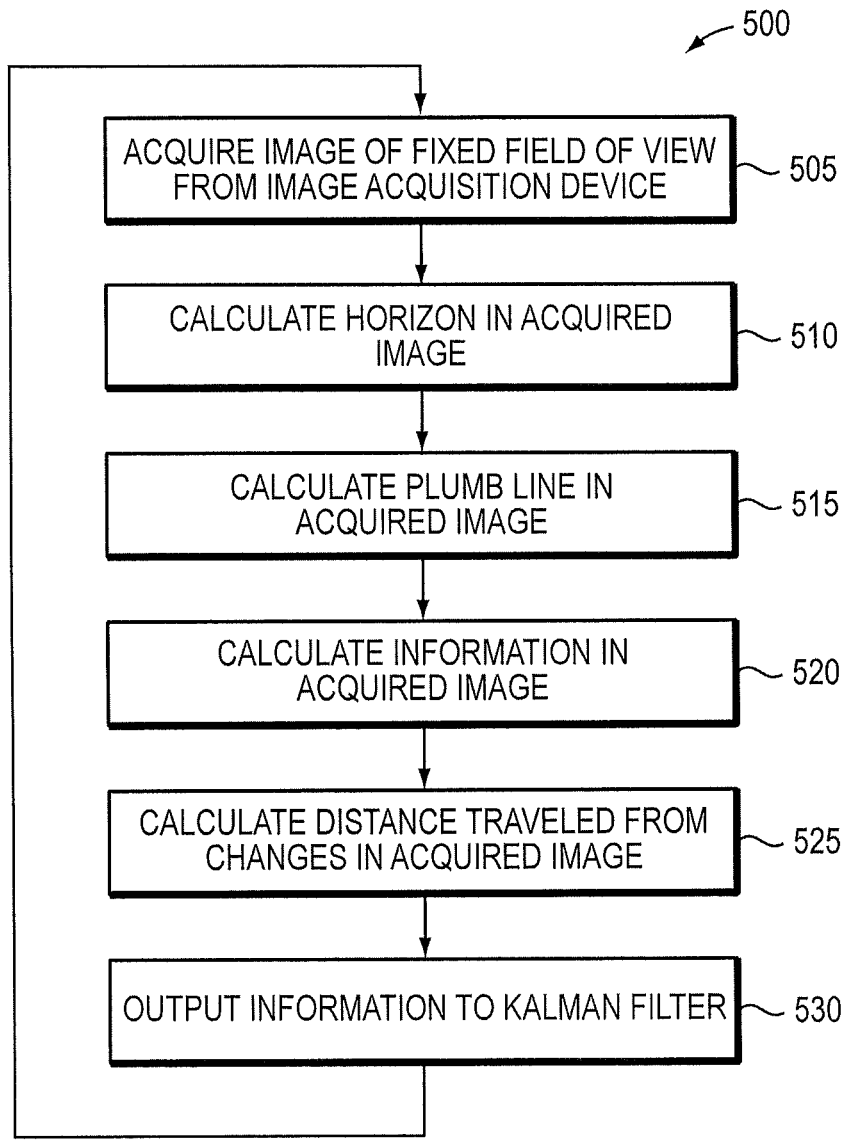
FIG. 5 is an exemplary flowchart detailing the steps of a procedure for a GNSS/INS navigation system to be augmented by a vision system in accordance with an illustrative embodiment of the present invention.

FIG. 5 is a flowchart detailing the steps of the procedure 800 for using a vision system to augment a GNSS/INS system for a use in a cargo port environment in accordance with an illustrative embodiment of the present invention. Procedure 500 begins in state 505 where an image of the fixed field of view is acquired by an image acquisition device. Illustratively, the image acquisition device comprises a video camera that acquires a plurality of images per second. In accordance with an illustrative embodiment of the present invention, each of the acquired images is time stamped by the clock 240 so that calculations performed thereon are associated with a particular point in time. Once the image has been acquired, the vision system then, in step 510, identifies the horizon in the acquired image. As noted above in reference to FIG. 4, calculating the horizon may be performed using one of a variety of machine vision techniques including, for example, edge detection techniques.

Then, in step 515 the digital system calculates a plumb line in the acquired image. As noted above in reference to FIG. 3, a plumb line may be determined by performing an edge detection technique on the acquired image to determine vertical lines associated with edges of a container. These detected edges may then be extrapolated to determine a vertical line that is perpendicular to the horizon. The plumb line may be utilized for other calculations once determined. In step 520, the vision system calculates scaling information in the acquired image. The system may also, in step 525, calculate a distance traveled from changes between two acquired images. Such calculation of a distance traveled may be performed as described above in relation to FIGS. 4A, B.

The vision system then outputs information the Kalman filter in step 530. The Kalman filter combines the GNSS information, INS information and vision system information as described above to generate output location information that may be utilized by the operator of the vehicle.

Various embodiments of the present invention have been described. However, it should be noted that the description contained herein should be taken as exemplary only. The various functionality described herein may be performed by hardware, firmware, software, including a non-transitory computer readable medium embodying program instructions for executing a processor, or a combination thereof. As such, the description of any functions being performed by specific entity should be taken as exemplary only.

What is claimed is:

1. A system for providing navigation and location information for a vehicle to navigate among a plurality of stacked containers located within a cargo port environment, comprising:
    a Global Navigation Satellite System (GNSS) system configured to provide GNSS location information related to the vehicle;
    an inertial navigation system operatively interconnected with the GNSS system, the inertial navigation system configured to provide inertial location information related to the vehicle;
    an image capture device configured to obtain one or more images of a fixed field of view of the plurality of stacked containers;
    a vision system configured to determine vision system location information using the one or more captured images, wherein the vision system location information comprises scaling information of the plurality of stacked containers, wherein the GNSS system, the inertial navigation system and the vision system share a common clock; and
    a processor configured to set up various matrices for a Kalman filter to determine a location of the vehicle and to navigate the vehicle among the plurality of stacked containers located within the cargo port environment using the GNSS location information, the inertial location information and the vision system location information, wherein the processor is located on the vehicle with the GNSS system, inertial navigation system, image capture device, and vision system.

2. The system of claim 1 wherein the vision system is configured to determine a horizon line in the one or more captured images.

3. The system of claim 1 wherein the vision system is further configured to determine a plumb line in the one or more captured images.

4. The system of claim 1 wherein the vision system location information comprises a distance travelled of the vehicle.

5. The system of claim 1 wherein the vision system location information comprises a speed of the vehicle.

6. The system of claim 1 wherein the Kalman filter increases a weighting of the vision system location information when the vehicle encounters a multipath environment.

7. The system of claim 1 wherein the vision system is further configured to determine a distance travelled by comparing a change in position of a feature in a first and second image of the one or more images of the fixed field of view.

8. The system of claim 7 wherein the feature comprises an edge of an image of a container in the cargo port environment.

9. The system of claim 1 wherein the vision system is further configured to time stamp each of the one or more images, wherein the time stamp is from the common clock associated with the GNSS system and the inertial navigation system.

10. A method for providing navigation and location information for use in a vehicle among a plurality of stacked containers located within a cargo port environment, comprising:
    using a Global Navigation Satellite System (GNSS) system to determine a set of GNSS location information;
    using an inertial navigation system to determine a set of inertial location information;
    obtaining one or more images using an image acquisition device having a fixed field of view of the plurality of stacked containers;
    using a vision system to obtain a set of vision system location information using the one or more obtained images, wherein the vision system location information comprises scaling information of the plurality of stacked containers, wherein the set of vision system location information is time stamped to a common clock shared with the GNSS system and the inertial navigation system; and
    determining, by a processor, a set of location information for the vehicle to navigate among the plurality of stacked containers located within the cargo port environment using various matrices for a Kalman filter, wherein the Kalman filter processes the various matrices from the sets of GNSS location information, inertial location information and vision system location information, wherein the processor is located on the vehicle with the GNSS system, inertial navigation system, image acquisition device, and vision system.

11. The method of claim 10 wherein using the vision system to obtain the set of vision system location information comprises determining a plumb line in the one or more obtained images.

12. The method of claim 10 wherein using the vision system to obtain the set of vision system location information comprises determining a distance travelled by the vehicle.

13. The method of claim 10 wherein using the vision system to obtain the set of vision system location information comprises determining a horizon in the one or more obtained images.

14. The method of claim 10 further comprising time stamping each of the one or more images, wherein the time stamp is from the common clock associated with the GNSS and inertial navigation systems.

15. The method of claim 10 further comprises modifying a weighting associated with the GNSS location information.

* * * * *

UNITED STATES PATENT AND TRADEMARK OFFICE
CERTIFICATE OF CORRECTION

PATENT NO. : 9,435,651 B2
APPLICATION NO. : 14/295749
DATED : September 6, 2016
INVENTOR(S) : Kristian Morin It is certified that error appears in the above-identified patent and that said Letters Patent is hereby corrected as shown below:

On the Title Page

First column, the Assignee should be corrected as follows:
--(73) Assignee: Hexagon Technology Center GmbH, Heerbrugg (CH)--

Signed and Sealed this
Fourth Day of June, 2019

Andrei Iancu
*Director of the United States Patent and Trademark Office*